April 14, 1959     J. L. GIFFEN     2,881,929
BLANK FEEDER AND STACKER
Filed Nov. 26, 1956     2 Sheets-Sheet 1

INVENTOR
JAMES L. GIFFEN
BY Bates + Willard
ATTORNEYS

April 14, 1959  J. L. GIFFEN  2,881,929
BLANK FEEDER AND STACKER
Filed Nov. 26, 1956  2 Sheets-Sheet 2

INVENTOR
JAMES L. GIFFEN
BY Bates & Willard
ATTORNEYS

United States Patent Office 2,881,929
Patented Apr. 14, 1959

2,881,929

BLANK FEEDER AND STACKER

James L. Giffen, Hudson, N.Y., assignor to Emhart Manufacturing Company, Hartford, Conn., a corporation of Delaware Application November 26, 1956, Serial No. 624,266

7 Claims. (Cl. 214—1)

The present invention relates to a machine for feeding and removing work pieces from a power press and more particularly to mechanism for feeding metal plates or the like successively and automatically to a notching press for peripheral notching to form electric motor laminations and other articles of a similar character.

A main object of the invention is to provide a machine of the character described which operates consistently and without failure and which may be used either as an attachment to a power press or as an integral part of the press.

A further object is to provide mechanism for feeding work pieces from a magazine to a die and in which mechanism each work piece is individually transferred independently of other work pieces in the supply magazine.

Another object is to provide a mechanism in which each work piece is gripped and held at the work station and discharged therefrom automatically following performance of press or dieing operations thereon.

A further object is to provide a mechanism of the described character and in which the work pieces are oriented in a supply magazine as by means of keyways and an orienting key, and are individually transferred to the die and to a discharge station while maintaining the preselected orientation of each work piece and its keyway relative to the die and to the other work pieces at the discharge or completed work station.

The foregoing objects, features and advantages, and others which appear more fully hereinafter, are accomplished by the apparatus illustrated in the accompanying drawing in which.

Figure 1:
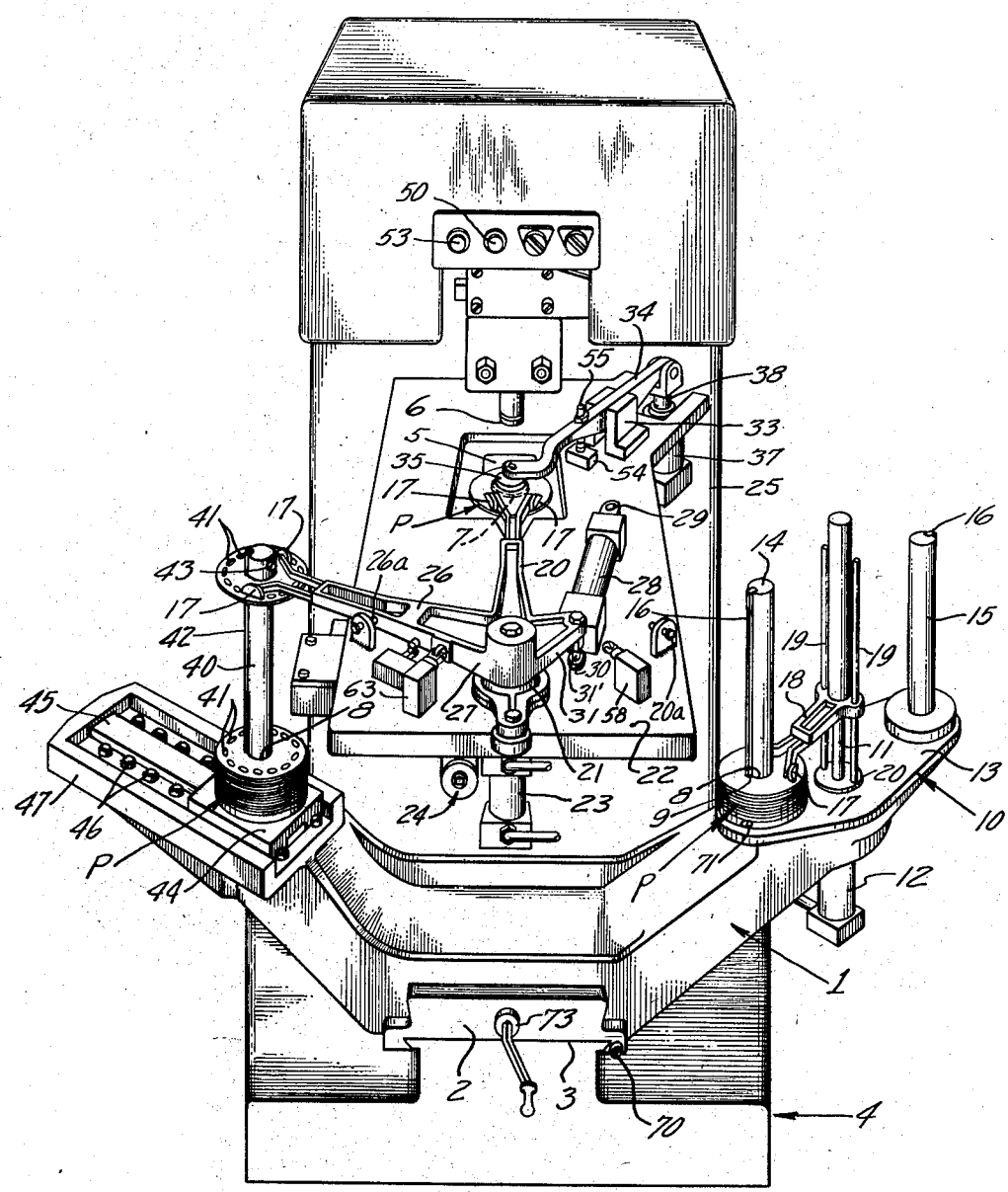
Figure 1 is a simplified perspective view of a machine embodying the invention.

Referring to Fig. 1, the illustrated mechanism for transferring successive work pieces to and away from the forming station of a press is shown operably mounted upon the frame of the press and adjustable relative thereto. However, it is to be understood that the transferring mechanism, including frame work, may be provided as a separate machine unit which is adapted to be positioned adjacent a press and to have the operation of the transfer mechanism integrated and coordinated with that of the press.

The frame work of the transfer mechanism, as shown in the drawing, is generally designated 1, and includes a horizontal bed plate 2 which is adjustably secured on the horizontal work table 3 of a power press which is generally designated 4. The press may include a notching die 5 and punch 6, or other suitable tool, for fashioning a work piece P at a forming station on an arbor or spindle 7 to which the work piece P is fed and on which the work piece is held during the die-forming operation and thereafter removed by the mechanism of the present invention.

The work pieces P shown in the drawings may be flat circular plates or discs which are adapted to be assembled as electric motor laminations. It should be understood, however, that the particular work piece P which is shown is merely illustrative and that the invention is applicable to work pieces in a wide variety of shapes and sizes. The illustrated work piece P has a central circular aperture 8 with keyway 9 which is adapted to fit snugly on the keyed portion 7a and be supported by an annular shoulder portion 7b of the arbor 7 for the notching of the periphery of the work piece P with the punch 6. The aperture 8 provides for subsequent assembly of the work piece on a shaft (not shown) to form a laminated motor rotor or the like. The aperture 8 normally includes a notch or keyway 9 with which to key each of an assembly of the work pieces to a rotor shaft or the like.

A magazine or holder, generally designated 10, is provided on the table 1 from which the work pieces or discs P are fed individually and successively to the arbor or spindle 7 for notching by the punch 6.

As shown in Fig. 1, the magazine 10 includes a vertically disposed piston rod 11 which extends through the frame 1 and is vertically reciprocated by means of a fluid piston motor 12 which is fastened to the under side of the frame.

Mounted for pivotal movement about the rod 11 is a magazine plate 13 to which is secured a pair of identical upward projecting vertical posts 14 and 15 which are equally and diametrically spaced from the rod 11 about which the plate 13 swings.

A conventional latching detent (not shown) releasably secures the plate 13 in the illustrated position and provides for manually grasping posts 14 and 15 and swinging the plate 13 out of the latched position shown and latching the plate 13 with the post 15 in the identical position in which post 14 is shown in the drawing. Thus, when the supply of discs, or other work pieces P on the post 14 becomes exhausted, the post 15 with a fresh supply may be swung to the feeding position in which post 14 is shown, and a fresh stack placed on the empty post 14 without more than momentarily interrupting the continuously automatic feeding of discs to the press.

Normally, each post 14 and 15 has a key 16 or similar member for aligning the keyways, slots or driving holes of the discs P stacked on the posts.

The uppermost disc in the stack is adapted to be gripped by magnets 17 on a pickup arm 18 which is raised and lowered by the piston rod 11 and motor 12.

Provision also is made for preventing swinging movement of the arm 18. In the illustrative embodiment, a pair of guide shafts 19 project up from the hub 20 on which the magazine plate 13 swings.

The shafts 19 are parallel to the piston rod 11 and prevent pivotal movement of the arm 18 while permitting reciprocal movement to remove each top disc P of the stack from the unloading post or arbor 14.

As the disc or similar workpiece P is removed from the unloading post 14 by the lift arm 18, a second or blank transfer arm 20 takes, and thereafter transfers, the workpiece P to the fixture spindle 7 at the die notching station for the press.

More particularly, the transfer arm 20 is operably supported for pivotal movement on a vertically disposed piston rod 21 which projects upwardly through an upper table 22 from a piston motor 23. The housing of the motor 23 is secured to the under side of the table 22 which may be adjusted by means of an upper adjustment screw 24 to a selected position relative to the frame 25 of the press on which the upper table 22 is adjustably secured.

As shown in Fig. 1, a second transfer arm 26 projects from the hub 27 of the blank transfer arm 20 which is secured to the upper end of the piston rod 21. The two arms 20 and 26 are substantially the same length and disposed at an angle to each other in their common horizontal plane of pivotal movement which is effected by a piston motor 28, the housing of which is pivotally secured at 29 to the table 22. Suitable stops 20a and 26a are provided for limiting the swinging movement of the arms 20 and 26. Piston rod 30 of the motor 28 is pivotally secured to a crank arm 31 which extends outwardly from the hub 27 of the transfer arms 20 and 26. A sliding connection 31' between the rod 30 and arm 31 permits the raising and lowering of the arms 20 and 26 relative to the motor 28 and rod 30. Secured to the outer end of the arms are magnets 17 for gripping and transferring the workpieces P to and from the punching station at the arbor 7.

Pivotally mounted on the table 22 as by means of bracket 33 is a hold-down lever 34 to the forward end of which is secured a hold-down pad 35 for pressing a workpiece P firmly home on the arbor 7 responsive to a piston motor 37, the housing of which is secured to the table 22 with piston rod 38 operatively connected to the hold-down arm 34.

Means may be provided, but are not illustrated in the drawings, for intermittently rotating the arbor 7 about its vertical axis with a workpiece P mounted thereon, so that successive strokes of the press cause the punch to notch or shape the workpiece in a predetermined pattern.

As shown in Fig. 1, a post or spindle 40 is provided for receiving and retaining the workpieces P from the transfer arm 26 after the blanks have been suitably notched or otherwise punched, as at 41, by the punch 6. The spindle 40 may be provided with a key 42 for the keyway of the workpieces P and at its upper end has a spring latch or detent 43 which yields to each workpiece P pressed down on the spindle 40 by the transfer arm 26. The latch 43 holds the workpiece on the spindle and strips the workpiece from the magnets 17 when the arm 26 is raised.

The post 40 is fastened to a support 44, the underside of which is slidably mounted as shown in Fig. 1 on suitable antifriction bearings 46 associated with a guideway 45 on the bracket portion 47 of the table 2.

The operation of the transfer mechanism heretofore described is synchronized with the operation of the press punch 6 by limit switches which are identified more particularly in the following description of their control and operation of the transfer apparatus.

*Operation*

Blanks P are stacked on both of the arbor posts 14 and 15 preparatory to starting the press. The motor switch 50 is manually closed to energize the motor relay 51 and start the press motor 52 which is latched in operation until the relay 51 is deenergized as by manually opening the stop switch 53.

Assuming that the components of the transfer mechanism are in the position illustrated in Fig. 1, the lamination transfer arm 26 is at the stacking post 40 and the blank transfer arm 20 is at the punch station where the pressure pad 35 on the hold down arm 34 presses the work piece P firmly onto the arbor 7 responsive to the piston 37. As the pressure pad 35 reaches the bottom of its downward stroke, a three-way switch 54 (Fig. 2) is operated by the adjustable actuator 55 (Fig. 1) on the arm 34. Preferably, the actuator 55 is set so that if more than one disc P is transferred to or remains on the arbor 7, the extra thickness of discs prevents the pressure pad 35 and the arm 34 from swinging down far enough to move the switch 54 to the position shown in Fig. 2. However, with one or no work piece on the arbor 7, the switch 54 is actuated so as to energize solenoid 56 which engages the press clutch (not shown) or otherwise acts to actuate the punch 6 which thereupon stamps the work piece P in a preselected pattern with a predetermined sequence of press strokes while the work piece is intermittently rotated, or otherwise oriented relative to the punch 6 between successive press strokes.

Figure 2:
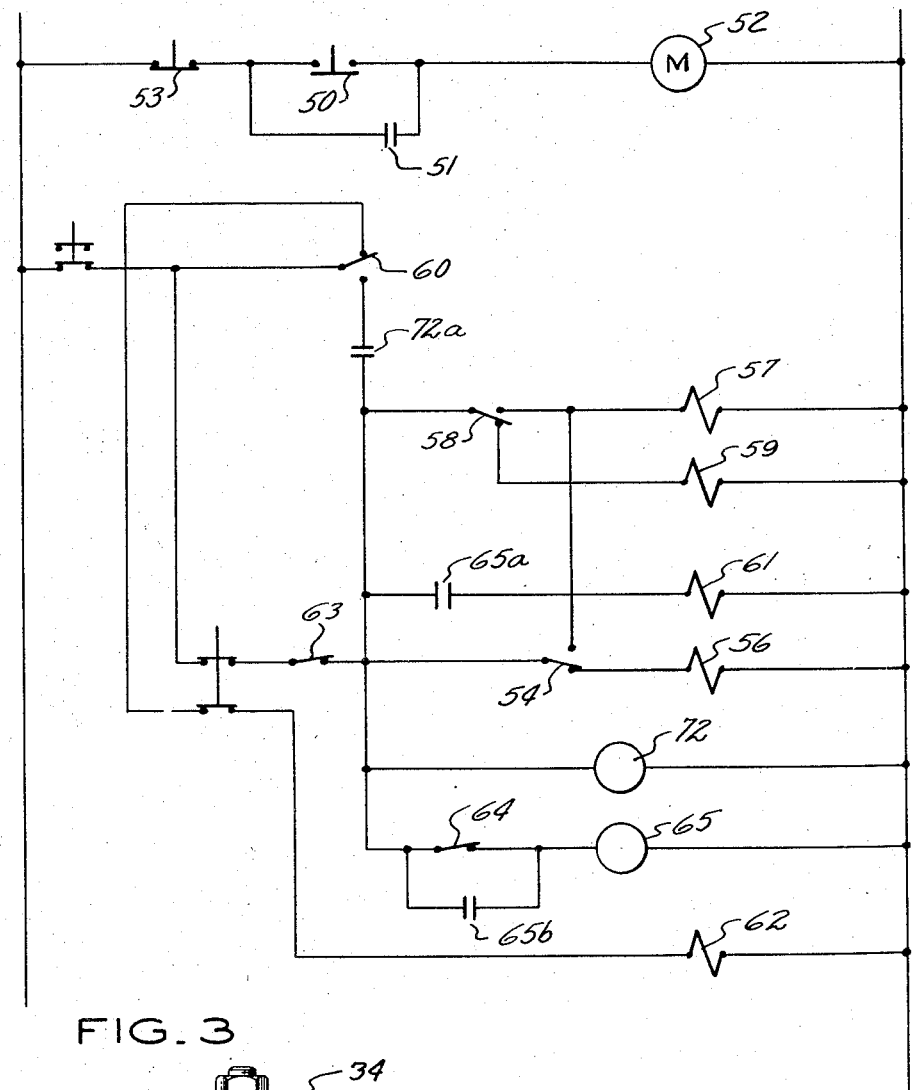
Fig. 2 is a wiring diagram of the apparatus shown in Fig. 1.
Figure 3:
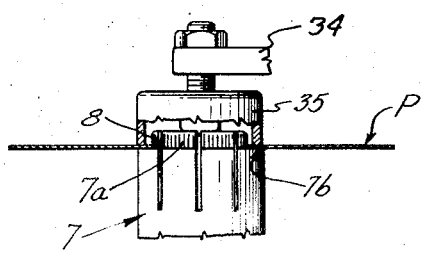
Fig. 3 is an enlarged fragmentary view partially broken away to show arbor and hold-down apparatus.

Movement of the switch 54 to the position shown in Fig. 2 also opens the circuit to and deenergizes a solenoid 57 which controls the motor 23.

More particularly, the deenergized solenoid 57 causes the motor 23 to raise the piston rod 21 and the transfer arms 20 and 26 which are secured thereto. Starting of the press operates a counter (not shown) which actuates a switch 60 to deenergize a solenoid 62 and cause the motor 28 to swing the arm 20 to the blank receiving station and the arm 26 to the punch station.

When the blank transfer arm 20 reaches the end of the right-hand travel, the arm 20 engages and actuates microswitch 58 so as to energize the solenoid 57 and thereby actuate the motor 23 to lower the transfer arms 20 and 26. As is apparent from Fig. 2, actuation of the microswitch 58 to energize the solenoid 57 also acts to deenergize a solenoid 59, which upon being deenergized acts to operate the motor 12 so as to raise the blank pick-up arm 18.

The pick-up magnets 17 carry a blank P from the stack on the post 14 as the pick-up arm rises so that the blank is raised to a point where it meets and is held by the magnets 17 on the blank transfer arm 20 while the pick-up arm 18 continues to rise and be detached from the blank which is retained by the transfer arm 20.

During the raising and transferring of the blank workpiece P to the transfer arm 20, the press operates in conventional manner to punch the work piece P on the arbor 7 with one or more strokes of the punch 6. The pattern of strokes is preselected and controlled in well known manner relative to the rotation of the work piece P by conventional controls (not shown). When the notching pattern has been completed for a workpiece, the microswitch 60 is actuated to deenergize the solenoid 56 and thereby unclutch or otherwise deactivate the press. The actuation of the switch 60 also deenergizes a solenoid 61 and the solenoid 57. Deenergization of the solenoid 61 operates the piston motor 37 to raise the hold down arm 34 and pressure pad 35 and otherwise free the punched work piece on the arbor 7 for ready removal therefrom. Deenergization of the solenoid 57 causes the piston motor 23 to raise the transfer arms 20 and 26, the latter acting to raise the work piece P above the arbor post 14 at the blank loading station and the former acting to raise the punched work piece from the arbor 7 at the punching station.

As shown in Fig. 2, the actuation of the switch 60 acts to energize the solenoid 62 which when energized operates the piston motor 28 to cause the raised transfer arms 20 and 26 to swing to the left until the arm 26 engages and closes a normally open microswitch 63 to energize the solenoid 57 and thereby cause the piston motor 23 to lower the transfer arms 20 and 26.

The down travel of the lamination transfer arm 26 actuates a microswitch 64 which thereupon energizes a relay 65 and closes relay contacts 65a so as to energize the solenoid 61 which operates the piston motor 37 and causes the hold down arm 34 and pusher pad 35 to press the work piece from the transfer arm 20 onto the arbor 7 and the described cycle is repeated.

Preferably the pusher pad 35 expands the arbor so as to securely hold the disc P for the orienting and punching operations which are performed in a preselected pattern on the disc by the punch 6.

As the machine notches, the arms 20 and 26 rise and the blank transfer arm 20 returns to the loading station while the lamination transfer arm 26 moves over the blank being notched preparatory to removing the blank when the notching is completed. With the completion of the notching, the punch 6 stops, the hold down plate 35 rises and the punched disc P is in the magnetic control of the lamination transfer arm 26 which raises and transfers the laminate to the arbor 40 while the transfer arm 20 is bringing a new blank P to the arbor 7 at the notching station.

When the arms 20 and 26 descend, the mechanical latch 43 latches the laminate on the arbor 40 while the hold down 35 centers and secures the blank disc P on the arbor 7 for notching.

When the arbor 14 of the blank loading station is empty, the turret 13 is rotated manually so that the arbor 15 with a supply of discs P is positioned at the pick-up station and the empty arbor 14 reloaded with blanks.

When the lamination arbor 40 at the stacking station is filled with finished work pieces P, it is manually pushed out of the way and a new arbor is placed in position.

It will be apparent that the apparatus heretofore described maintains the orientation of the keyways of the work pieces throughout the cycle of operations from the feed arbor 14 to the stacking arbor 40 for the finished pieces.

Adjustment of the apparatus heretofore described is relatively simple.

After the press has been adjusted to produce satisfactory laminations, run the press through a cycle, disconnect the air or other operating fluid to the several piston motors.

Thereafter pick up a blank P from the disc holder arbor 7 with the blank transfer arm 20 and rotate the transfer arm by hand until the blank P is over the arbor 14.

Loosen tapered gib screw 70 and rotate lower adjusting screw 73 until the arbor 14 is exactly under the hole of the blank P. Loosen set screw 71 holding the blank arbor 14 and rotate the arbor until its key 16 is in line with the keyway in the blank P and tighten the set screw 71. Rotate the blank loading turret 13 and line up the key of the other blank arbor 15.

The key 42 of the arbor 40 at the stacking station is aligned in a similar manner and the several microswitches are set to operate so as to effect the sequence or cycle of operations already described.

A latching relay 72 holds relay contacts 72a closed after switch 63 is opened so long as the switch 60 supplies current to the relay contacts 72a.

Having described a preferred embodiment of the invention, I claim:

1. Apparatus for feeding and moving metal plates from a power press or the like which operates to reform the metal plates individually and successively, said apparatus having a magazine including means for stacking a supply of the plates and for orienting and maintaining the orientation of the plates relative to each other in said magazine, movable means including a permanent magnet for lifting said plates individually from the magazine, movable transfer means including a permanent magnet which receives and removes the lifted plate from the lifting means and transversely transfers and lowers the lifted plate to a forming station, said transfer means presenting each plate in the same position of orientation relative to the forming station, means for gripping and holding a plate at the forming station and releasing said plate when forming has been effected thereon, said gripping means including detecting means indicating when more than one plate is at the forming station, means including a permanent magnet for removing a formed plate from the forming station to a final assembly station concurrently with movement of a plate from the magazine to the forming station, means for detaching each formed plate from the last said permanent magnet and retaining each said formed plate at the assembly station when a plate is lowered to the forming station, and means for preserving at the assembly station the same orientation of the formed plates that existed in the magazine prior to forming operations thereon.

2. Apparatus for feeding and removing metal plates from a power press or the like which operates to reform the metal plates individually and successively, said apparatus having a magazine including means for stacking a supply of the plates and for orienting and maintaining the orientation of the plates relative to each other in said magazine, movable means including a permanent magnet for lifting said plates individually from the magazine, movable transfer means including a permanent magnet which receives and removes the lifted plate from the lifting means and transversely transfers and lowers the lifted plate to a forming station, said transfer means presenting each plate in the same position of orientation relative to the forming station, means for gripping and holding a plate at the forming station and releasing said plate when forming has been effected thereon, said gripping means including detecting means indicating when more than one plate is at the forming station, means including a permanent magnet for removing a formed plate from the forming station to a final assembly station concurrently with movement of a plate from the magazine to the forming station, means for detaching each formed plate from the last said permanent magnet and retaining each said formed plate at the assembly station when a plate is lowered to the forming station, means for preserving at the assembly station the same orientation of the formed plates that existed in the magazine prior to forming operations thereon, means for adjusting the transfer means and the path of travel of the plates relative to the forming station, and means for adjusting the positions of the magazine and the assembly stations relative to the forming station.

3. Apparatus for feeding and removing metal plates from a power press or the like which operates to reform the metal plates individually and successively, said apparatus having a magazine including means for stacking a supply of the plates, means for orienting and maintaining the orientation of the plates relative to each other in said magazine, means for lifting said plates individually from the magazine, transfer means which intercepts and detaches the lifted plate from the lifting means and thereafter transversely transfers and lowers said lifted plate to a forming station, said transfer means presenting each plate in the same position of orientation relative to the forming station, means for gripping and holding said plate at the forming station and releasing said plate when forming has been effected thereon, said gripping means including detecting means indicating when more than one plate is at the forming station, said transfer means including means for removing a formed plate from the forming station to a final assembly station concurrently with movement of a plate from the magazine to the forming station, means for collecting and retaining each formed plate at the assembly station when a plate is lowered to the forming station, means for preserving at the assembly station the orientation of the formed plates that existed in the magazine prior to forming operations thereon, means for adjusting the transfer means and the path of travel of the plates relative to the forming station, and means for adjusting the positions of the magazine and the assembly stations relative to the forming station.

4. Apparatus for feeding and removing metal plates from a power press or the like which operates to reform each metal plate individually and successively, said apparatus having a magazine including means for confining and vertically stacking a supply of the plates, means for orienting and maintaining the orientation of the plates relative to each other in said magazine, upwardly movable means including a permanent magnet engageable with the top surface of the uppermost plate in the magazine for lifting said uppermost plate from the magazine, transfer means including a permanent magnet which intercepts and cooperates with the magazine to detach the lifted plate from the upwardly movable means and thereafter transfer said plate transversely and lower said plate to a work station, and means for gripping and holding said plate at a forming station for detaching said plate from said transfer means.

5. Apparatus for feeding and removing metal plates from a power press or the like which operates to reform each metal plate individually and successively, said apparatus having a magazine including means for confining and vertically stacking a supply of the plates, means for orienting and maintaining the orientation of the plates relative to each other in said magazine, upwardly movable means including a pair of permanent magnets engageable with the top surface of the uppermost plate in the magazine for lifting said uppermost plate from the magazine, transfer means including a pair of permanent magnets which intercept and cooperate with the magazine to detach the lifted plate from the upwardly movable means and thereafter transfer said plate transversely and lower said plate to a work station, and means for gripping and holding said plate at a forming station for detaching said plate from said transfer means.

6. Apparatus for feeding and removing metal plates from a power press or the like which operates to reform the metal plates individually and successively, said apparatus having a magazine including an arbor about which to stack a supply of the plates and including means for orienting and maintaining the orientation of the plates relative to each other on said arbor in said magazine, movable means including a permanent magnet for engaging the upper surface of the top plate on the arbor and magazine and movable transfer means including a permanent magnet which intercepts and removes the lifted plate from the lifting means and thereafter lifts the plate from the arbor and transversely transfers and lowers the lifted plate to a forming station.

7. Apparatus for feeding and removing metal plates from a power press or the like which operates to reform the metal plates individually and successively, said apparatus having a magazine including an arbor about which to stack a supply of the plates and including means for orienting and maintaining the orientation of the plates relative to each other on said arbor in said magazine, movable means including a permanent magnet for engaging the upper surface of the top plate on the arbor and magazine and movable transfer means including a permanent magnet which intercepts and removes the lifted plate from the lifting means and thereafter lifts the plate from the arbor and transversely transfers and lowers the lifted plate to a forming station, and means including a permanent magnet for removing a formed plate from the forming station to a final assembly station concurrently with movement of a plate from the magazine to the forming station, means for detaching each formed plate from the last said permanent magnet and retaining each said formed plate at the assembly station when a plate is lowered to the forming station.

References Cited in the file of this patent

UNITED STATES PATENTS

| | | |
|---|---|---|
| 1,706,533 | Lorig et al. | Mar. 26, 1929 |
| 1,933,226 | Smith et al. | Oct. 21, 1933 |
| 2,243,649 | Pearson | May 27, 1941 |
| 2,359,432 | McNamara | Oct. 3, 1944 |
| 2,570,660 | Gamble | Oct. 9, 1951 |
| 2,692,693 | Newburg | Oct. 26, 1954 |